Nov. 3, 1942.    J. D. RUSSELL    2,301,145
TWO-WAY STEERING CONTROL MECHANISM
Filed March 12, 1941    2 Sheets-Sheet 1

INVENTOR.
John D. Russell
BY Harold W. Hawkins
ATTORNEY.

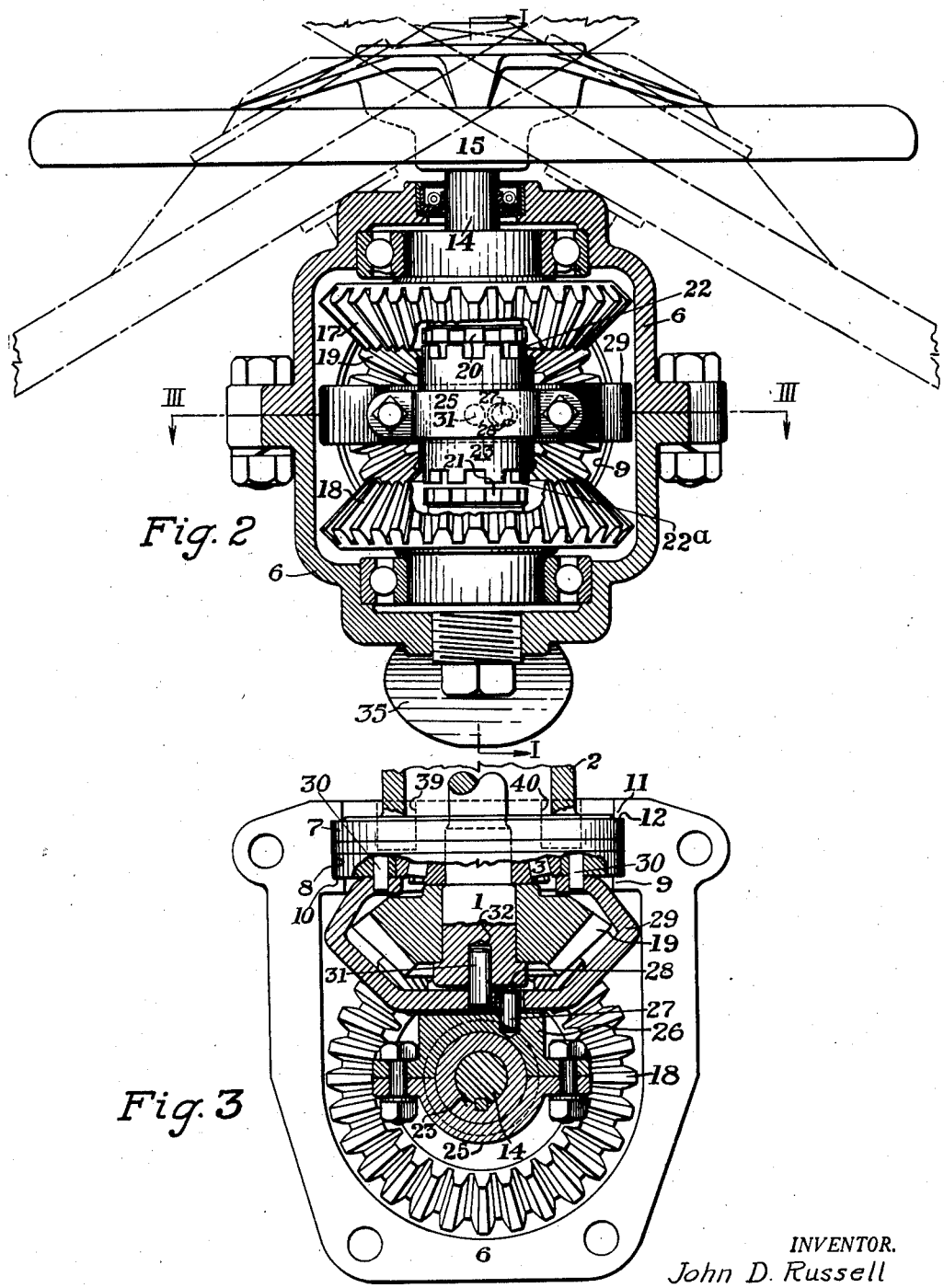

Patented Nov. 3, 1942

2,301,145

UNITED STATES PATENT OFFICE 2,301,145

TWO-WAY STEERING CONTROL MECHANISM

John D. Russell, Sugarcreek Township, Venango County, Pa., assignor to Joy Manufacturing Company, a corporation of Pennsylvania Application March 12, 1941, Serial No. 382,927

7 Claims. (Cl. 74—498)

This invention relates to mechanism for steering or guiding self-propelled vehicles, and more particularly to an improved steering control mechanism for vehicles adapted to be driven either forward or backward without turning where the operator faces in the direction of travel.

Self-propelled vehicles are now being used to an increasing extent in confined places or areas, such as the chambers of a coal mine, where it is impossible to turn the vehicle, and consequently the vehicle travels forward when moving in one direction and backward when moving in the opposite direction. To facilitate the handling of the vehicle under such conditions, provision is generally made for the operator to face, at all times, in the direction of travel of the car, and the controls are arranged so as to be readily accessible from both operating positions. However, in all vehicles of this character, known to me, the steering mechanism is of the conventional type, and the steering wheel controlling the guiding of the vehicle is turnable in different directions to make left and right hand turns when moving forward and backward.

For example, assume that the vehicle is traveling forward and the operator desiring to make a right hand turn merely turns the steering wheel to the right or in the direction he wishes to go, but when traveling backward the operator must turn the steering wheel to the left to make a right hand turn, or in the opposite direction from the direction he wishes to turn. This is not only confusing to the operator, but extremely dangerous in vehicles used in underground mine chambers where the vehicle generally travels between rows of closely spaced roof supporting members or props, since a mistake generally results in several props being knocked down with a resultant fall of roof.

The object of this invention is to provide twoway steering control mechanism for self-propelled vehicles which will permit the steering wheel to always be turned in the direction of the turn being made regardless of the direction of travel of the vehicle.

Another object of this invention is to provide a mechanism for steering or guiding a self-propelled vehicle which is simple in construction, easy to assemble and install on a vehicle, and positive in operation.

These and other objects which will hereinafter be made apparent to those skilled in this particular art, are accomplished by means of this invention, one embodiment of which is described in the following specification and illustrated in the accompanying drawings, wherein:

Fig. 2 is a vertical transverse section of the improved steering control mechanism shown in Fig. 1, having a portion of the gears broken away for convenience of illustration;

Fig. 3 is a sectional view taken on line III—III of Fig. 1 having a portion thereof broken away.

Figure 1:
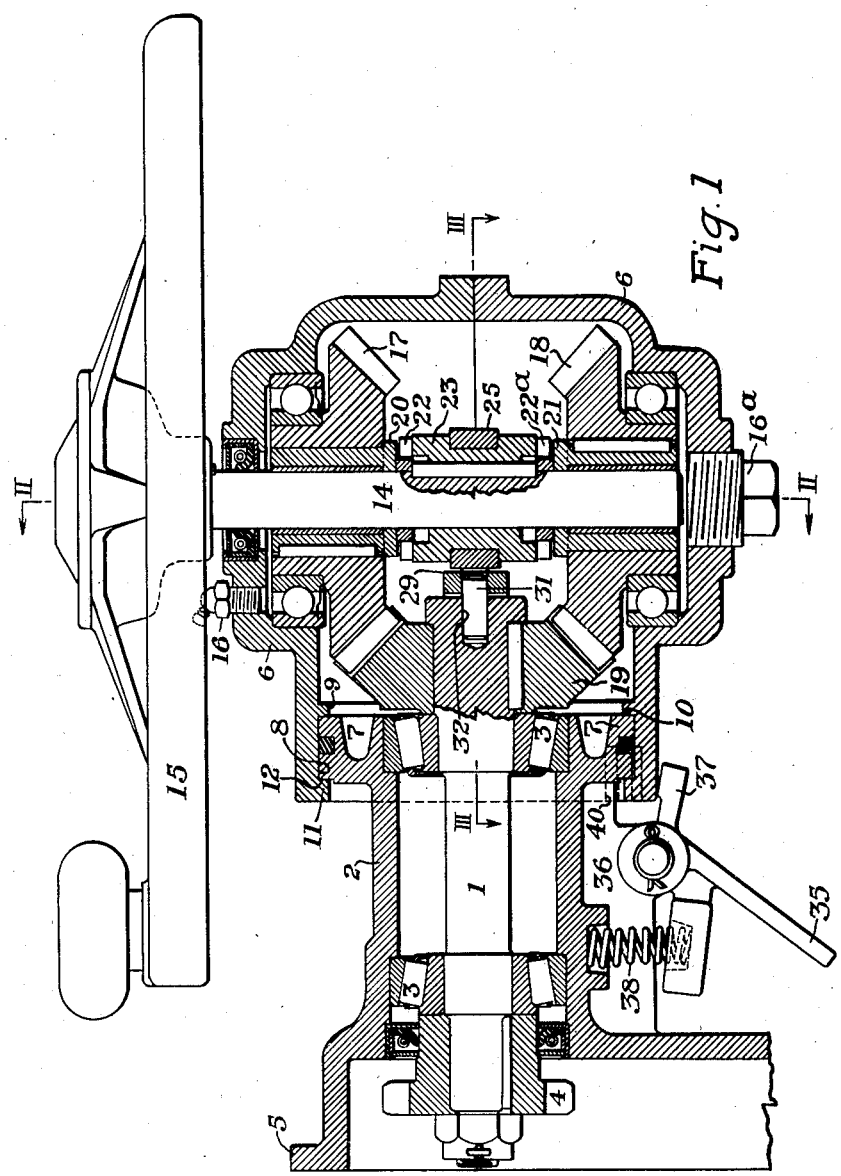
Fig. 1 is a vertical longitudinal section of a two-way steering control mechanism embodying my invention, with the parts shown in a neutral position, and the locking pin raised into inoperative position.

Referring to the drawings, I indicates the main steering shaft or column of the steering mechanism of a self-propelled vehicle, and 2 a hollow post surrounding the column I which is rotatably supported therein on antifriction bearings 3. While the column I is shown with a sprocket 4 on one end for connecting the column to the standard steering mechanism of the vehicle, and the post illustrated has a flange 5 adapted to be secured on the side of the vehicle, it is to be understood that the sprocket 4 may be replaced with a worm of conventional type and the post may be of a different shape and size and may be mounted on the vehicle in any appropriate place without departing from the spirit of my invention.

The forward or outer end of the steering column I, projects beyond the end of the post 2 and extends into a two part or split housing 6 which is mounted for rotation on an annular hub 7 formed integrally with the post 2. Each part of the housing 6 has an annular groove 8 formed in its inner surface between a relatively short inwardly projecting flange 9 and a lip II which slidably engage the opposite faces 10 and 12 on the rim of hub 7 when the housing is assembled thereon. This construction permits the housing case 6 to move rotatively around the longitudinal axis of shaft I and hub 7, but prevents longitudinal movement along this said axis. Means as at 16 and 16A serve to provide lubrication for the mechanism contained in housing case 6.

Journaled in the housing 6, and extending perpendicular to the column I, is the end of a short shaft 14 having a hand wheel 15 secured to the outer end thereof for turning the shaft 14. Loosely mounted on that portion of the shaft 14, within the housing 6, are spaced bevel gears 17—18 which mesh continuously with a bevel gear 19 secured to the end of the steering column I.

In order that the turning of the hand wheel 15 and the shaft 14 will be transmitted to the steering column 1, the gears 17—18 are provided with clutch jaws 20—21, respectively, adapted to receive the jaws 22—22a on a sleeve or clutch element 23, which may be keyed or splined on the shaft 14 between the gears 17—18. Clutch 23 is slidable therealong to engage either of the jaws 20 or 21 as desired. For this construction the column 1 will be turned or rotated in one direction when the jaws 22 on the clutch 23 are in engagement with the clutch jaws 20, and in the opposite direction when the jaws 22a engage the jaws 21, so long as the hand wheel 15 and the shaft 14 are rotated in the same direction when shifted to their proper angular position as indicated by dotted lines in Fig. 2.

In order to throw the clutch, a two-piece collar 25 surrounds and is clamped to the clutch element 23. One part of the collar 25 carries an enlarged boss 26 having a pin 27 mounted therein and which projects into a slot 28 in a strap 29 surrounding the bevel gear 19 on the steering column 1. The ends of the strap 29 are fastened to the hub 7 of the post 2 by pins 30 and is further stabilized and held in place by a pin 31 which is secured to the strap 29 and projects into an opening 32 formed in the center of the end of the steering column 1.

The slot 28 is eccentric to the longitudinal axis of the steering column 1, and as the housing 6 is mounted to rotate about the longitudinal axis of the steering column, it is apparent that the operation of the clutch 23 is entirely automatic and that as the housing is oscillated on the hub 7 the clutch element 23 will be moved back and forth by pin 27, which engages slot 28 to move the jaws 22 or 22a into engagement with either of the clutch jaws 20 or 21 respectively.

In Fig. 2 the full lines show the position of the parts of my improved steering control mechanism in neutral position, with the clutch 23 midway between the gears 17—18 and the jaws 22—22a disengaged from the clutch jaws 20—21, respectively. Assume, for example, that the hand wheel 15 is now pulled to the dotted position shown on the left side of Fig. 2. This movement of the hand wheel turns the housing on the hub 7 about the axis of the column 1 and the shaft 14 is moved to a tilted position. The tilting of the shaft 14 imparts a turning movement to the clutch element 23 and the collar 25 carried thereby, but this movement is resisted by the pin 27 operating in the slot 28 of the strap 29, and the element 23 is therefore caused to slide upwardly on the shaft 14 to bring the jaws 22 into engagement with the jaws 20. If, with the parts in this position, the hand wheel 15 is turned clockwise to make a right hand turn, the shaft 14 and the gear 17 are also turned clockwise while the gear 19 and the column 1 are also turned clockwise, as seen in Fig. 2.

When the hand wheel 15 is shifted to the dotted position shown at right of Fig. 2, the clutch jaws 22 are disengaged from the jaws 20 and jaws 22a are moved into engagement with the jaws 21 on the gear 18. In this position, if the hand wheel 15 is again turned clockwise, to make a right hand turn, the steering column 1 will be turned in a counter-clockwise direction, or in the opposite direction from that in which it is turned when the hand wheel 15 was in the left hand position.

It is apparent that my improved steering control mechanism can be readily applied to any automotive vehicle where driving in both directions is required, and when so applied the steering control means can readily be oriented to positions such that the operator, when facing in the direction of travel, and regardless of whether the car is moving forward or backward, a right hand turn is made by turning the steering wheel to the right and a left hand turn is made by turning the steering wheel to the left.

To prevent accidental displacement of the clutch jaws 22—22a with the jaws 20—21, I provide a manually operated stop for locking the housing 6 in fixed relation with post 2 and its hub 7. In the present instance the stop comprises a knee operated lever 35 pivoted between bracket webs 36 carried by the post member 2 and having a latch 37 yieldably pressed against the outer surface of the housing 6 by means of a spring 38 as the housing is rotated on the hub 7. Housing 6 is provided with latch openings 39 and 40 which are so spaced apart and are so located that the latch 37 will drop thereinto when the housing has been turned sufficiently to engage the clutch jaws 22—22a with the jaws 20—21, respectively, and thus lock the housing against accidental movement.

While I have described one embodiment of my invention, it is apparent that various changes, modifications, alterations, substitutions and additions may be made therein without departing from the spirit of my invention or the scope of the appended claims.

What I claim as new and desire to secure by Letters Patent is:

1. Mechanism of the character described comprising in combination, a steering column, a support in which said column is journaled, a housing rotatably mounted on said support and into which the end of the steering column projects, a gear on the end of said column, a shaft journaled in said housing, a pair of gears loosely mounted on said shaft and in mesh with the gear on said column, and means operable on the rotation of said housing in opposite direction for connecting said gears alternately to said shaft.

2. Mechanism of the character described comprising in combination, a steering column, a support in which said column is journaled, a housing mounted for rotation on the end of said support and into which the end of said column extends, a shaft extending transversely of the axis of said support and having one end journaled in said housing, a hand wheel secured to said shaft for rotating said shaft and turning the housing on said support, and means for connecting said column to said shaft for turning movement therewith on rotation of said housing in either direction.

3. Mechanism of the character described comprising in combination, a steering column, a support in which said column is journaled, a housing mounted for rotation on the end of said support and into which the end of said column extends, a shaft extending transversely of the axis of said support and having one end journaled in said housing, a hand wheel secured to said shaft for rotating said shaft and turning the housing on said support, and means for connecting said shaft to said column for turning movement in opposite directions as said housing is rotated from one side to the other side of its travel.

4. A two-way steering control mechanism, comprising a steering column, a member mounted for rotation about the axis of said column, a manually turnable shaft journaled in said member extending transversely of the axis of said column and means to turn said shaft on its axis and on the axis of said support, and means for connecting said column to said shaft for turning movement therewith on rotation of said member in either direction about the axis of said column.

5. A two-way steering control mechanism comprising a steering column, a member adjacent one end of said column and rotatable about the longitudinal axis thereof, a manually turnable shaft journaled in said member, a pair of spaced bevel gears loosely mounted on said shaft, a bevel gear on said column in mesh with each of said first mentioned gears, and means on said shaft and operable on rotation of said member in opposite directions for alternately connecting said first mentioned bevel gears to said shaft.

6. A two-way steering control mechanism comprising a steering column, a member mounted for rotation about said steering column, a manually turnable shaft journaled in said member, a pair of spaced bevel gears loosely mounted on said shaft and having clutch jaws thereon, a bevel gear on said column in mesh with the gears on said shaft, a clutch element splined to said shaft and slidable between the gears mounted thereon, and means operable on rotation of said member in opposite directions to move said clutch element alternately into engagement with the jaws on said bevel gears.

7. A two-way steering control mechanism comprising a steering column, a member mounted for rotation about said steering column, a manually turnable shaft journaled in said member, a pair of spaced bevel gears loosely mounted on said shaft and having clutch jaws thereon, a bevel gear on said column in mesh with the gears on said shaft, a clutch element splined to said shaft and slidable between the gears mounted thereon, and a clutch shifter eccentrically carried by the steering column and engaging said clutch to shift the same into selective engagement with the gears of the pair.

JOHN D. RUSSELL.